Patented Feb. 10, 1931

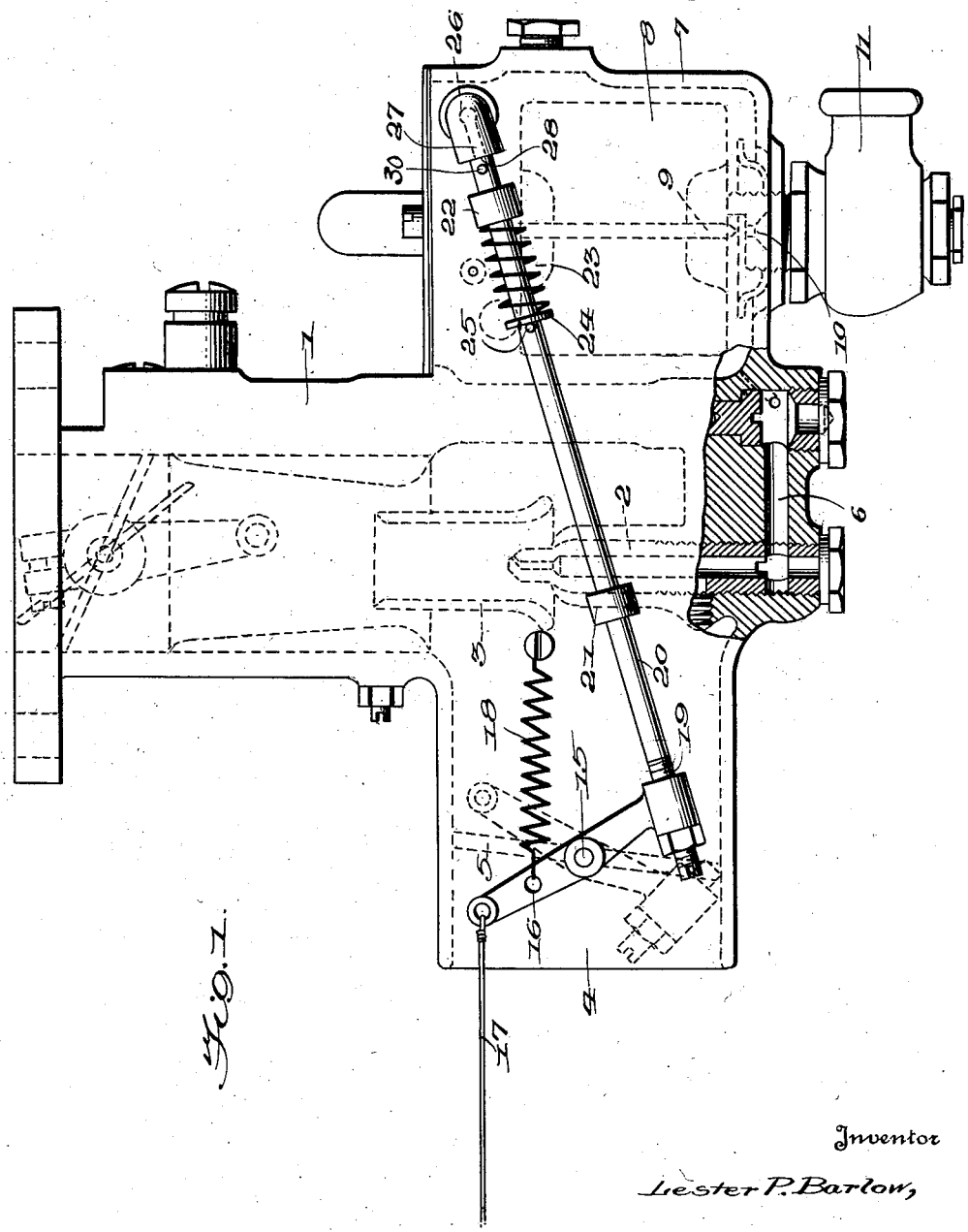

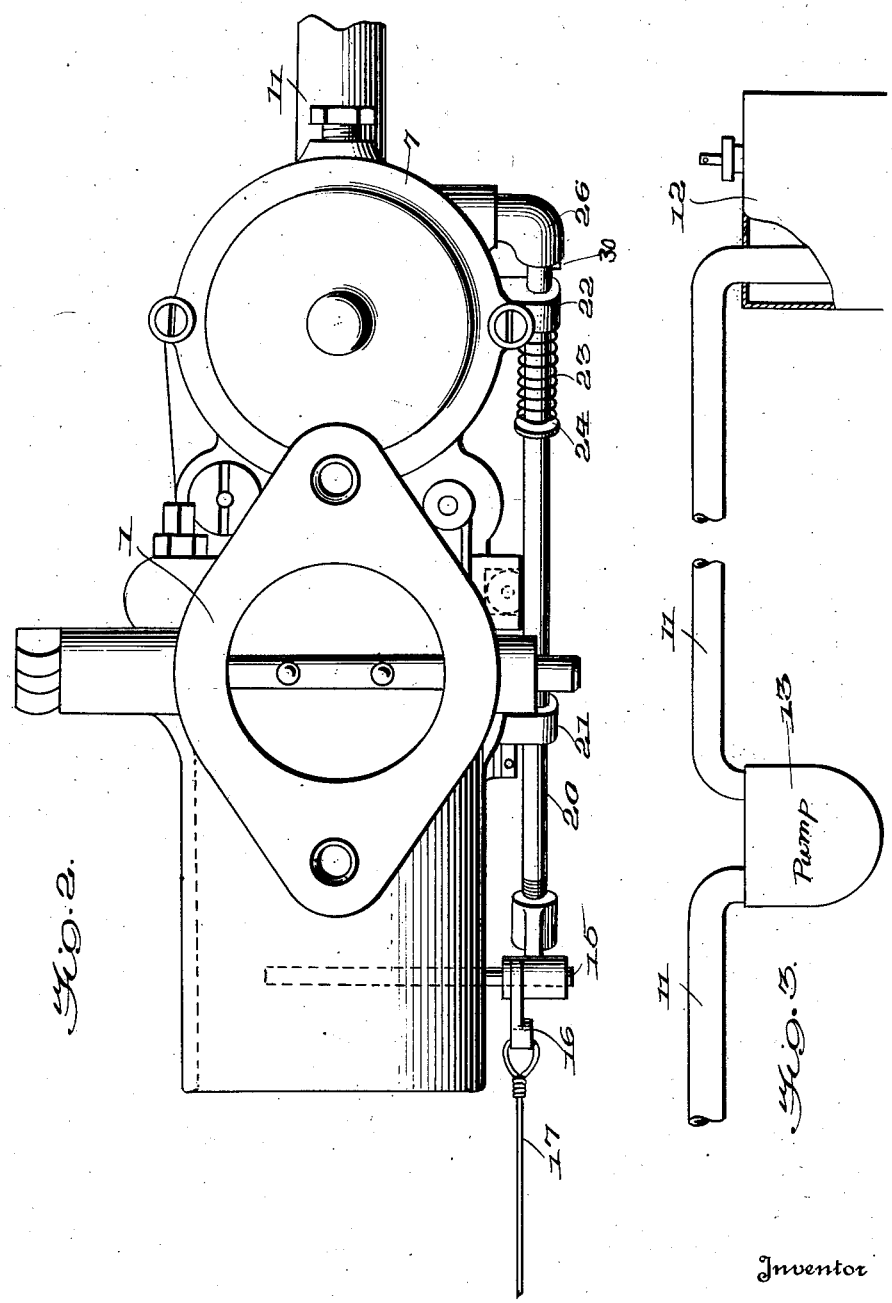

1,792,408

UNITED STATES PATENT OFFICE

LESTER P. BARLOW, OF DETROIT, MICHIGAN

FUEL-SUPPLY SYSTEM

Application filed August 20, 1928. Serial No. 300,712.

My invention relates to fuel supply systems for internal combustion engines and has for its object to provide means by which the fuel may be supplied in sufficient quantity in starting a cold engine to ensure the priming necessary to form in the engine cylinder an explosive charge.

The gasoline or other fuel for an internal combustion engine is usually supplied to the carbureter from a float bowl in which a hollow metal or cork float is arranged to control admission of liquid that the liquid will not be above a predetermined level, the float bowl being provided in its upper portion with an open air vent through which air may pass freely into or from the float bowl so that the pressure within the float bowl will not vary from atmospheric. The fuel is usually supplied to the float bowl from a fuel tank so located that it will flow by gravity to the float bowl.

Admission of air to the carbureter is usually through a valve controlled inlet opening.

When a cold engine is to be started the engine is turned over by an electric or other starter or by a hand crank so that the movement of the pistons in the cylinders will draw in an explosive mixture from the carbureter. In order that the explosive mixture may not be too lean it is usual to close the valve controlling the air inlet. But even with the air inlet closed it is a matter of difficulty to start a cold engine and special priming is often necessary.

Supplying fuel to the float bowl by gravity necessitates locating the fuel tank at an elevation above the float bowl and in an automobile the relative level of the float bowl and fuel tank may vary greatly as the automobile goes up or down hills. In order to maintain a constant unvarying supply of fuel irrespective of the relative levels of the float bowl and fuel tank, a pump is now used to drive the fuel from the tank to the float bowl, this pump being driven through suitable driving connections from the engine shaft.

Turning over the engine in starting, while it will start the pump, will not cause it to operate with much efficiency on account of its necessarily slow operation and the supply of fuel to the float bowl may be insufficient for the necessary priming, particularly if there is any leakage of air into the fuel supply system.

It is the object of my present invention to overcome this difficulty in starting a cold engine when a power feed for the fuel is used though the invention is adapted for use also where gravity feed is used.

With the object above indicated and other objects hereinafter explained in view my invention consists in the construction and combination of elements hereinafter described and claimed.

Referring to the drawings:

Figure 1 is a side view partly in section of a carbureter and float bowl embodying my invention.

Figure 2 is a top plan view of the same, and

Figure 3 is a side view of the fuel supply pipe.

In the drawings 1 indicates a carbureter here shown as having a nozzle 2 for admitting gasolene or other liquid fuel arranged to deliver the gasolene to a mixing tube 3 to the lower end of which air is admitted from air inlet 4 controlled by choke valve 5. 6 indicates the fuel supply pipe leading from float bowl 7 to nozzle 2. 8 indicates the float in the float bowl carrying needle valve 9 which controls inlet opening 10 from pipe 11 which leads from fuel tank 12. 13 indicates a pump in pipe 11 for supplying liquid fuel from tank 12 to float bowl 7 and through pipe 6 to the carbureter.

Choke valve 5 in air inlet 4 is pivoted on shaft 15 on which is secured arm 16 extending above and below the shaft. To the upper portion of arm 16 is secured a pull cord 17 for swinging the valve to open position and spring 18 for swinging it to closed position. The lower portion of arm 16 is adapted at its lower end to carry adjustable pin 19, the inner end of which bears against the end of rod 20 which is longitudinally slidable in guides 21 and 22. Spring 23 coiled about rod 20 bears at one end against guide 23 and at the other end against ring 24 held by pin 25. A stop pin 30 carried by rod 20 acting against guide 22 limits the rearward movement of the rod.

Float bowl 7 is provided near its upper end with air vent 26 to permit air to pass in or out as the level of the liquid in the float bowl varies so as to maintain atmospheric pressure therein under ordinary conditions. At the inner end of the vent opening valve seat 27 is provided and slidable rod 20 carries at its end valve 28 adapted to fit valve seat 27 to close the vent opening against escape of air from the float bowl.

When the engine is to be started choke valve 5 is closed by means of cord 17 and as the upper end of arm 16 is swung to the left as indicated in Figure 1 the end of adjustable pin 19 carried by weight 18 strikes the outer end of rod 20 sliding the rod to the right and forcing valve 28 on its end against valve seat 27 closing vent opening 26. As the engine is turned over by the starter, or by the hand crank, the pump, which is driven from the engine shaft, forces fuel into the float bowl and, as the vent 26 is closed, forces the fuel to the carbureter and through it to the engine cylinders, thus supplying fuel necessary for priming.

The turning over of the engine causes the contents of the carbureter to be drawn into the cylinders tending to create a vacuum, the choke valve being closed against entrance of air through air inlet 4. If the air vent 26 is open air will enter through it to relieve the vacuum and, while liquid contained in the float chamber will be drawn into the carbureter, the liquid fuel so supplied may not be sufficient to supply sufficient fuel for priming. By closing air vent 26 against entrance of air the suction of the engine cylinders will be effective to draw liquid fuel through pipe 11 from fuel tank 12, thus providing the fuel necessary for priming the pump, the suction due to the movement of the piston in the engine cylinder being thus effective through the float chamber, the portion of pipe 11 leading from the engine, the engine, and the portion of pipe 11 leading from the fuel tank to the pump, thus priming the pump.

Having thus described my invention what I claim is:—

1. In a fuel supply system for an internal combustion engine comprising a carbureter having an air inlet and a fuel inlet, a float bowl for supplying fuel to the fuel inlet of the carbureter having a normally open air vent therein and otherwise closed against inlet of air, positively operating means for supplying fuel to the fuel bowl, means for closing the air inlet of the carbureter and means for closing the air vent of the float bowl, simultaneously with the closing of the air inlet of the carbureter arranged to leave the air vent fully open until the air inlet of the carbureter is fully closed.

2. In a fuel supply system for an internal combustion engine comprising a carbureter having an air inlet and a fuel inlet, a float bowl for supplying fuel to the fuel inlet of the carbureter having a normally open air vent therein and otherwise closed against inlet of air, means for supplying fuel to the float bowl, a valve for closing the air inlet of the carbureter, means for holding the valve in open position, means for moving the valve to closed position and means for closing the air vent of the float bowl simultaneously with the closing of the air inlet of the carbureter arranged to leave the air vent fully open until the air inlet of the carbureter is fully closed.

3. In a fuel supply system for an internal combustion engine comprising a carbureter having an air inlet and a fuel inlet, a float bowl for supplying fuel to the fuel inlet of the carbureter having a normally open air vent therein and otherwise closed against inlet of air, means for supplying fuel to the float bowl, a normally open valve for the air inlet of the carbureter, means for closing the valve and means operated by the valve closing means for the air inlet of the carbureter closing the vent valve for the float bowl arranged to act upon the valve only on completion of the closing of the valve of the air inlet.

4. In a fuel supply system for an internal combustion engine comprising a carbureter having an air inlet and a fuel inlet, a float bowl for supplying fuel to the fuel inlet for the carbureter having a normally open air vent therein, means for supplying fuel to the float bowl, a normally open valve for the air inlet of the carbureter, a pivoted arm for closing the valve, a push rod having one end in the path of movement of the pivoted arm and carrying a valve at its other end for closing the air vent of the float bowl.

5. In a fuel supply system for an internal combustion engine comprising a fuel mixing device having an air inlet and a fuel inlet, a float bowl for supplying fuel to the fuel inlet of the fuel mixing device having an air vent therein, means for supplying fuel to the float bowl, a normally open valve for the air inlet of the fuel mixing device, a pivoted arm for closing the valve, a push rod having one end in the path of movement of the pivoted arm and carrying a valve at its other end for closing the air vent of the float bowl and a spring normally holding the valve of the push rod away from its seat.

6. In a fuel supply system for an internal combustion engine a fuel mixing device connected with the intake of the engine, having an air inlet and a fuel inlet, positively operating means for supplying fuel to the fuel inlet and means for so reducing access of air to the fuel mixing device that the suction of the engine will draw fuel into the mixing device during the priming operation.

7. In a fuel supply system for an internal combustion engine a fuel mixing device having a fuel inlet and an air inlet, a fuel reservoir, a pipe leading from the fuel reservoir to said fuel inlet, a pump in said pipe and means for so reducing access of air to the mixing device that the suction of the engine will draw fuel from the fuel reservoir through the pump into the mixing device during the priming operation to thereby prime the mixing device and the pump.

8. In a fuel supply system for an internal combustion engine comprising a fuel mixing device having an air inlet and a fuel inlet, a float bowl for supplying fuel to the fuel inlet of the fuel mixing device having a normally open air vent therein and otherwise closed against inlet of air, means operated by the engine for supplying fuel to the fuel bowl, means for closing the air inlet of the fuel mixing device and means for closing the air vent of the float bowl.

9. In a fuel supply system for an internal combustion engine comprising a fuel mixing device having an air inlet and a fuel inlet, a float bowl for supplying fuel to the fuel inlet of the fuel mixing device having a normally open air vent therein and otherwise closed against inlet of air, means operated by the engine for supplying fuel to the float bowl, a valve for closing the air inlet of the fuel mixing device, means for holding said valve in open position, means for moving said valve to closed position and means for closing the air vent of the float bowl.

10. In a fuel supply system for an internal combustion engine comprising a fuel mixing device having an air inlet and a fuel inlet, a float bowl for supplying fuel to the fuel inlet of the fuel mixing device having a normally open air vent therein and otherwise closed against inlet of air, means operated by the engine for supplying fuel to the float bowl, a normally open valve for the air inlet of the fuel mixing device, means for closing said valve and means operated by the valve closing means for the air inlet of the fuel mixing device for closing the air vent of the float bowl.

11. In a fuel supply system for an internal combustion engine comprising a fuel mixing device having an air inlet and a fuel inlet, a float bowl for supplying fuel to the fuel inlet of the fuel mixing device having a normally open air vent therein, means operated by the engine for supplying fuel to the float bowl, a normally open valve for the air inlet of the fuel mixing device, a pivoted arm for closing the valve, a push rod having one end in the path of movement of said pivoted arm and carrying a valve at its other end for closing the air vent of the float bowl.

12. In a fuel supply system for internal combustion engines comprising a carbureter having an air inlet and a fuel inlet, a float bowl for supplying fuel to the fuel inlet of the carbureter having a normally open vent therein, positively operating means for supplying fuel to the fuel bowl, and a single manual control means for closing the air inlet of the carbureter and the air vent simultaneously.

13. In a fuel supply system for internal combustion engines comprising an air inlet and a fuel inlet, a valve controlling the air inlet, a float bowl for supplying fuel to the carbureter having a vent and otherwise closed against inlet of air and a valve controlling the vent, means for holding the air inlet valve normally in open position, independent means for holding the vent valve normally in open position, manually controlled means for moving the air inlet valve towards closed position and means operated by said means for moving the air inlet valve towards closed position arranged to act upon the valve controlling the fuel bowl vent to force it to closed position.

14. In a fuel supply system for internal combustion engines comprising an air inlet and a fuel inlet, a valve controlling the air inlet, means for moving the valve toward open position arranged to hold it normally in open position, a float bowl for supplying fuel to the carbureter having a vent and otherwise closed against inlet of air and a valve controlling the vent, means for moving the valve to position to open the vent arranged to hold the vent normally open, manually controlled means for moving the air inlet valve towards closed position and means operated by said means for moving the air inlet towards closed position arranged to act upon the valve controlling the fuel bowl vent to force it to closed position simultaneously with the closing of the air inlet.

15. In a fuel supply system for internal combustion engines comprising an air inlet and a fuel inlet, a valve controlling the air inlet, means for moving the valve toward open position arranged to hold it normally in open position, a float bowl for supplying fuel to the carbureter having a vent and a valve controlling the vent, means for moving the valve to position to open the vent arranged to hold the vent normally open, maually controlled means for moving the air inlet valve towards closed position and means operated by said means for moving the air inlet towards closed position arranged to act upon the valve controlling the fuel bowl vent to force it to closed position simultaneously with the closing of the air inlet, the means for closing the air inlet valve being arranged to have a limited movement in a direction to close the air inlet without affecting the vent closing means.

16. In a fuel supply system for internal combustion engines comprising an air inlet and a fuel inlet, a valve controlling the air inlet, means for moving the valve towards open position arranged to hold it normally in open position, a float bowl for supplying fuel to the carbureter having a vent and a valve controlling the vent, means for so moving the valve as to open the vent arranged to hold the vent normally open, manually controlled means for moving the air inlet valve towards closed position, and means operated by said means for moving the air inlet towards closed position arranged as the air inlet valve reaches its closed position to act upon the valve controlling the fuel bowl vent to force it to closed position simultaneously with the closing of the air inlet.

In testimony whereof, I hereunto affix my signature.

LESTER P. BARLOW.